United States Patent
Jiang et al.

(10) Patent No.: US 9,656,341 B2
(45) Date of Patent: May 23, 2017

(54) LOW BACK PRESSURE PENETRATING ARC WELDING APPARATUS AND METHOD

(71) Applicant: Beijing University of Technology, Beijing (CN)

(72) Inventors: Fan Jiang, Beijing (CN); Jianxin Wang, Beijing (CN); Shujun Chen, Beijing (CN); Jinlong Gong, Beijing (CN); Guangqiang Men, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 14/917,270

(22) PCT Filed: Oct. 13, 2014

(86) PCT No.: PCT/CN2014/088498
§ 371 (c)(1),
(2) Date: Mar. 7, 2016

(87) PCT Pub. No.: WO2016/037392
PCT Pub. Date: Mar. 17, 2016

(65) Prior Publication Data
US 2016/0243642 A1     Aug. 25, 2016

(30) Foreign Application Priority Data
Sep. 10, 2014    (CN) .......................... 2014 1 0458970

(51) Int. Cl.
*B23K 10/00*    (2006.01)
*B23K 9/16*     (2006.01)
(Continued)

(52) U.S. Cl.
CPC ............... *B23K 9/16* (2013.01); *B23K 9/035* (2013.01); *B23K 9/164* (2013.01); *B23K 9/325* (2013.01)

(58) Field of Classification Search
CPC .......... B23K 9/16; B23K 9/164; B23K 9/325; B23K 10/006; B21K 10/00; H05H 1/36; H05H 1/26
(Continued)

(56) References Cited

U.S. PATENT DOCUMENTS 3,197,604 A  *  7/1965  Turbyville, Jr. ....... B23K 9/035
                                                    219/137 R
4,916,281 A  *  4/1990  Flasche ................ B23K 9/0282
                                                    219/61
(Continued)

FOREIGN PATENT DOCUMENTS

AU      2008202719 A      1/2009
CN         103264216 A    8/2013
(Continued)

*Primary Examiner* — Mark Paschall
(74) *Attorney, Agent, or Firm* — Han IP Corporation; Andy M. Han

(57) ABSTRACT

A low-back-pressure penetrating arc welding apparatus and a welding method using the same are disclosed. Through vacuuming a central vacuum chamber of a low-back-pressure protection device by a suction device, a plume of a penetrating arc located in the central vacuum chamber, as well as a back side of a keyhole molten pool, are maintained in a negative-pressure vacuum state relative to an argon gas ambience. A pressure gradient in the keyhole molten pool is thus generated that points from a front side of the keyhole molten pool to the back side of the keyhole molten pool. The pressure gradient thus further enhances a stiffness of the front side of the keyhole molten pool as well as a stability of the penetrating arc, resulting in an enhancement in the piercing capability of the penetrating arc, without changing a force distribution and a temperature gradient of the keyhole molten pool.

5 Claims, 5 Drawing Sheets

(51) Int. Cl.
*B23K 9/32* (2006.01)
*B23K 9/035* (2006.01)

(58) Field of Classification Search
USPC ............ 219/121.45, 121.46, 121.59, 137 R, 219/137.41
See application file for complete search history.

(56) References Cited

U.S. PATENT DOCUMENTS

| | | | | |
|---|---|---|---|---|
| 6,388,227 | B1* | 5/2002 | Dykhno | B23K 26/1429 219/121.45 |
| 6,713,710 | B1* | 3/2004 | Zhang | B23K 9/0352 219/121.34 |
| 8,393,519 | B2* | 3/2013 | Allehaux | B23K 20/1235 228/112.1 |
| 9,352,416 | B2* | 5/2016 | Khare | B23K 26/0823 |

FOREIGN PATENT DOCUMENTS

| | | |
|---|---|---|
| CN | 103658984 A | 3/2014 |
| EP | 0517430 B1 | 9/1995 |
| JP | 2003170273 A | 6/2003 |

\* cited by examiner

LOW BACK PRESSURE PENETRATING ARC WELDING APPARATUS AND METHOD

CROSS-REFERENCE TO RELATED APPLICATION

This application is the U.S. national stage application of International Application No. PCT/CN2014/088498, filed on Oct. 13, 2014. The above-identified patent application is hereby incorporated by reference in its entirety.

TECHNICAL FIELD

The present disclosure is related to a low-back-pressure penetrating arc welding apparatus and a welding method using the same, which belongs to the field of welding technology.

BACKGROUND

As modern industry moves in the direction of developing large-scale structures, welding structures made of thick and ultra-thick plates have become increasingly widespread. Consequently, the bar of standard for welding methods has been raised higher, which is hard to be met by conventional welding methods. At present, large bevel multi-pass metal active gas (MAG) welding, metal inert gas (MIG) welding or submerged arc welding are usually employed to weld slab joints of pressure vessels, boilers, train rails, ships and other large thick-walled metal structural products. With the increasing plate thickness of welded structures, these methods have shown greater limitations and thus become inappropriate. This is most manifested by the fact that the dramatic increase of the bevel area of the thick plates has caused the needed welding work to increase by many folds, resulting in much consumed welding supplies, low productivity and high welding cost. In addition, various kinds of welding defects are consequently introduced, such as high heat input, coarse grains, wide heat-affected zone, poor mechanical properties of the welded joints, and cracks and so on.

Plasma arc welding is a high-energy beam welding method, and provides apparent improvements over conventional free arc welding in terms of energy density and directivity of the arc. In particular, keyhole plasma arc welding has shown eminent advantages in welding thick plates, thanks to its high energy density and excellent arc penetration. The generation of keyholes, a prominent feature of high-energy-density welding processes, has greatly increased the welding depth achievable in one-pass welding. However, as the plates grow thicker, a larger penetration depth is demanded, which nevertheless increases the tendency of keyhole instability. That is, a proper balance between the heat input and a stable generation of the keyholes is extremely difficult to achieve. When the work pieces to be welded grow to certain thickness, the plasma arc will no longer be capable of penetrating the work pieces. Therefore, there is a need to solve the problem of how to achieve stable keyhole generation of the plasma arc, so as to further increase the plate thickness that can be handled by a welding process using plasma arc.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

A technical solution provided by the present disclosure is a low-back-pressure penetrating arc welding apparatus, and a welding method using the same, that overcomes the various deficiencies of the conventional methods employed at present, as mentioned above.

A low-back-pressure penetrating arc welding apparatus includes a welding torch and a low-back-pressure protection device. The low-back-pressure protection device includes a central vacuum chamber. The welding torch and the low-back-pressure protection device are configured to be disposed on two opposing sides of work pieces to be welded. The welding torch is configured to generate a penetrating arc having a plume to penetrate the work pieces with the plume of the penetrating arc located in the central vacuum chamber.

The low-back-pressure protection device further includes an argon gas chamber surrounding the central vacuum chamber.

The welding torch is configured to perform penetrating arc welding.

The low-back-pressure protection device is cylindrical. The central vacuum chamber is formed by a central hollow of the low-back-pressure protection device. The argon gas chamber is formed by a peripheral trench of the low-back-pressure protection device that surrounds the central hollow of the low-back-pressure protection device. A bottom side of the low-back-pressure protection device is provided with a through hole connected with the central vacuum chamber. An outer wall of the low-back-pressure protection device is provided with one or more argon gas inlets connected with the argon gas chamber. In addition, the central vacuum chamber of the low-back-pressure protection device is configured to contact the work pieces. The argon gas chamber of the low-back-pressure protection device is configured to be separated from the work pieces by a gap of 1-10 mm.

The low-back-pressure penetrating arc welding apparatus also includes a piping system. The piping system includes a suction device, a pressure relief device, a pressure display device, a valve; and a plurality of connecting pipes. The suction device, the pressure relief device and the valve are connected successively by the plurality of connecting pipes to the through hole on the bottom side of the low-back-pressure protection device to form a piping from the suction device to the central vacuum chamber of the low-back-pressure protection device. The pressure display device is connected with the pressure relief device.

The one or more argon gas inlets are uniformly provided on the outer wall of the low-back-pressure protection device.

A welding method using a low-back-pressure penetrating arc welding apparatus involves providing continually an argon gas to an argon gas chamber of a low-back-pressure protection device via one or more argon gas inlets on an outer wall of the low-back-pressure protection device. The welding method also involves setting a valve such that a piping from a suction device to a through hole on a bottom side of the low-back-pressure protection device is turned on. The welding method further involves activating the suction device such that a central vacuum chamber of the low-back-pressure protection device is maintained in a vacuum state. The welding method still further involves activating a welding torch to generate a penetrating arc, the penetrating arc penetrating work pieces and forming a keyhole molten pool thereon. A pressure gradient is generated in the keyhole molten pool, the pressure gradient pointing from a front side of the keyhole molten pool to a back side of the keyhole molten pool. The pressure gradient is configured to further enhance a stiffness of the front side of the keyhole molten pool, a stability of the penetrating arc and a piercing capability of the penetrating arc, without changing a force distribution and a temperature gradient of the keyhole molten pool.

Throughout an entire period of a welding process, the welding torch and the low-back-pressure protection device are disposed on two opposing sides of the work pieces. Also, throughout the entire period of the welding process, a plume of the penetrating arc is located in the central vacuum chamber of the low-back-pressure protection device.

The working principles of the present disclosure are stated as follows: A low-back-pressure protection device is placed on the back side of the work pieces to be welded, opposing the position where the welding torch is located on the front side of the work pieces. Throughout the welding process, argon gas is continually supplied via the argon gas chamber of the low-back-pressure protection device. The argon gas thus purges away the air around the low-back-pressure protection device. The piping disposed between the suction device and the central vacuum chamber is vacuumed such that the central vacuum chamber of the low-back-pressure protection device is maintained in a vacuum state. When the welding is taking place, the central vacuum chamber of the low-back-pressure protection device is in contact with the work pieces. (The contact of the central vacuum chamber with the work pieces may have a gap present in between. However, given that the air surrounding the central vacuum chamber has been purged away by the argon gas overflowing from the argon gas chamber, the central vacuum chamber of the low-back-pressure protection device is maintained in a vacuum state relative to the ambient argon gas.) Throughout the welding process, the welding torch is always in a position opposing the low-back-pressure protection device; the plume of the penetrating arc, as well as the back side of the keyhole molten pool, are always located in the vacuum argon ambience of the central vacuum chamber of the low-back-pressure protection device. A pressure gradient in the keyhole molten pool is thus generated that points from a front side of the keyhole molten pool to a back side of the keyhole molten pool. The pressure gradient thus further enhances the stiffness of the front side of the keyhole molten pool as well as the stability of the penetrating arc, resulting in an enhancement in the piercing capability of the penetrating arc, without changing a force distribution and a temperature gradient of the keyhole molten pool.

Compared with existing technologies, the welding apparatus and method according with the present disclosure is simple in setup as well as in operation. Through the employment of a low-back-pressure protection device, the welding apparatus and method has not only maximally increased the welding thickness of the regular penetrating arc welding technology, but also improved the back-side welding formation of keyhole welding by providing a negative-pressure vacuum state on the back side of the molten pool.

In the figures, 1: welding power supply and control system; 2: welding torch; 3: work pieces; 4: suction device; 5: connecting pipe A; 6: pressure relief device; 7: pressure display device; 8: connecting pipe B; 9: valve; 10: connecting pipe C; 11: low-back-pressure protection device; 12: welding cable A; 13: welding cable B; 14: arc; 111: central vacuum chamber; 112: argon gas chamber; 113: bottom through hole; 114: argon gas inlet.

DETAILED DESCRIPTION OF THE PREFERRED EMBODIMENTS

Figure 1:
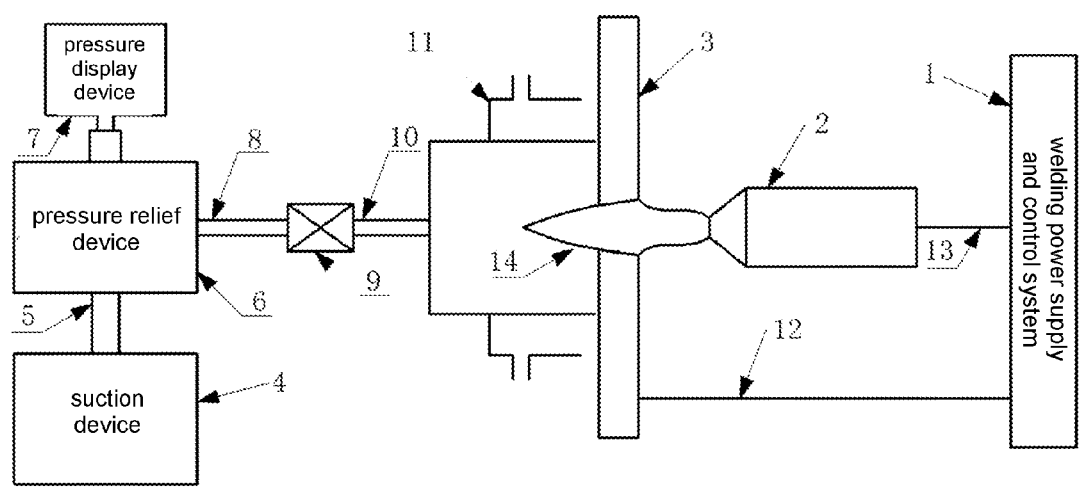
FIG. 1 is an illustration of an apparatus for realizing a welding method in accordance with an embodiment of the present disclosure.
Figure 2:
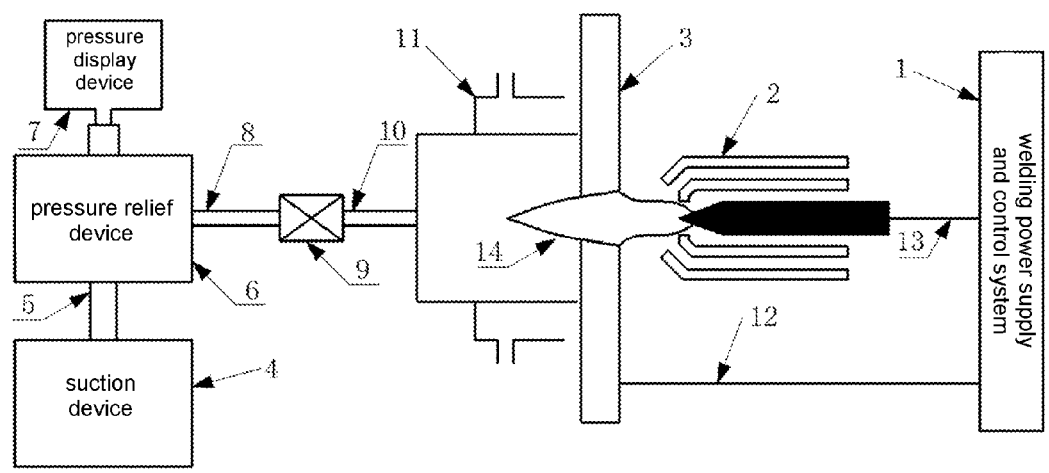
FIG. 2 is an illustration of an apparatus using keyhole plasma arc welding for realizing a welding method in accordance with an embodiment of the present disclosure.
Figure 3:
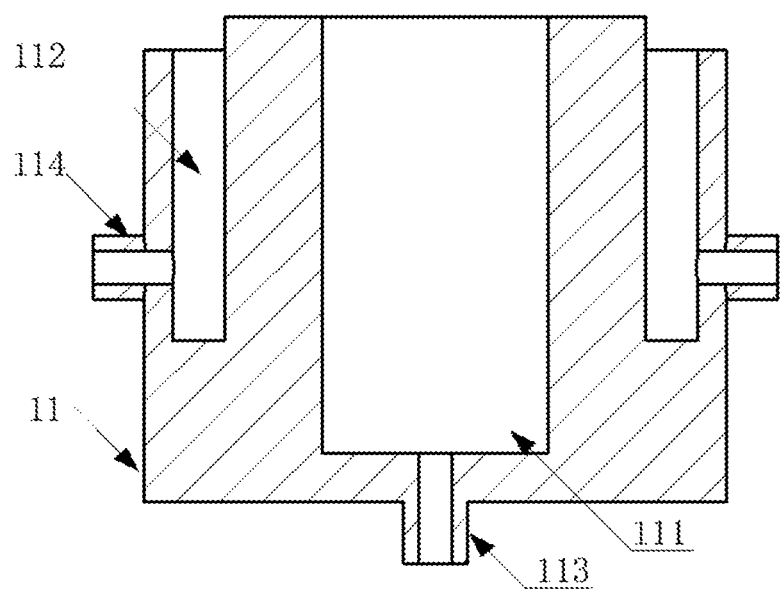
FIG. 3 is a front view of a low-back-pressure protection device in accordance with an embodiment of the present disclosure.
Figure 4:
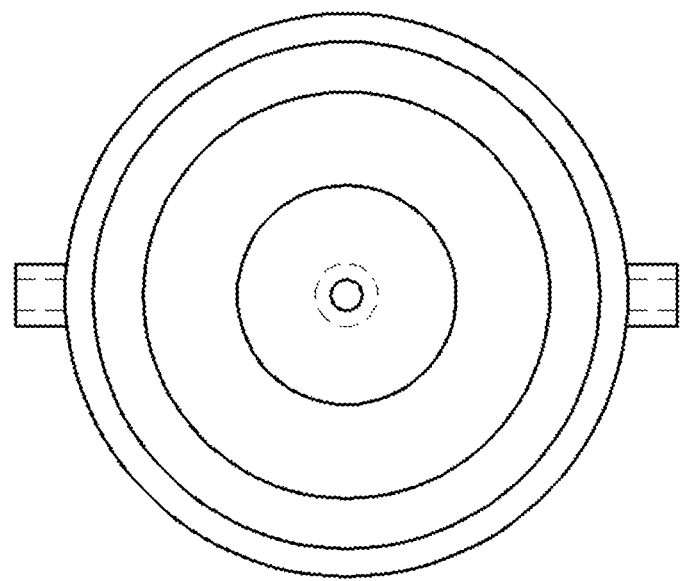
FIG. 4 is a top view of a low-back-pressure protection device in accordance with an embodiment of the present disclosure.
Figure 5:
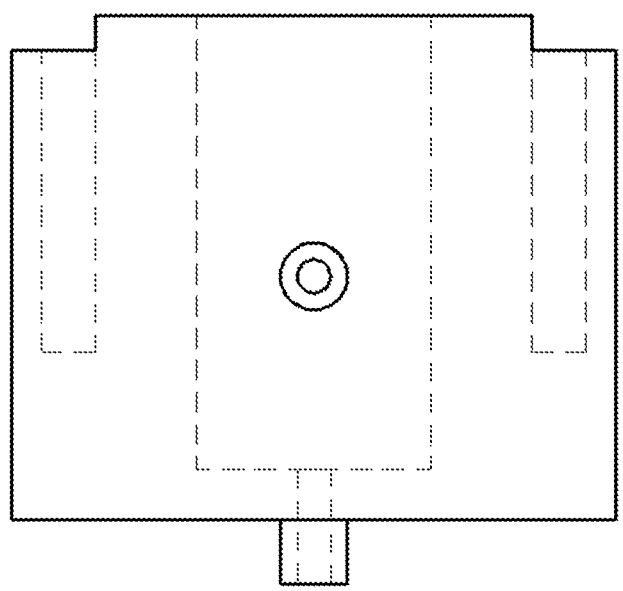
FIG. 5 is a left-side view of a low-back-pressure protection device in accordance with an embodiment of the present disclosure.

Preferred embodiments of the present disclosure are disclosed below, with references made to the figures. FIG. 1 is an illustration of an apparatus for realizing a welding method in accordance with an embodiment of the present disclosure. The low-back-pressure penetrating arc welding apparatus includes welding power supply and control system 1, welding torch 2, work pieces 3, suction device 4, pressure relief device 6, pressure display device 7, valve 9 and low-back-pressure protection device 11. A gas piping is formed by successively connecting suction device 4, connecting pipe A 5, pressure relief device 6, connecting pipe B 8, valve 9, connecting pipe C 10 and low-back-pressure protection device 11. Pressure display device 7 is connected with pressure relief device 6. A electrical circuit is formed by successively connecting welding power supply and control system 1, welding cable A 12, work pieces 3, welding torch 2, welding cable B 13 and welding power supply and control system 1. No further description of gas lines and waterways are given herein as they are implemented using common connections methods.

Referring to FIGS. 2-5 and taking keyhole plasma arc welding as an example, described below are the welding apparatus and the welding method according with the present disclosure:

Firstly, acquire work pieces 3 to be welded and the compatible welding wires. Dispose plasma welding torch 2 on one side of work pieces 3 at a proper location with respect to work pieces 3. Dispose low-back-pressure protection device 11 on the other side of work pieces 3 such that central vacuum chamber 111 of low-back-pressure protection device 11 opposes plasma welding torch 2. The opening end of central vacuum chamber 111 contacts work pieces 3. Gas lines and waterways that are needed by plasma welding torch 2 are connected thereto using common connections methods. Ensure that the piping composed of suction device 4, connecting pipe A 5, pressure relief device 6, connecting pipe B 8, valve 9, connecting pipe C 10 and low-back-pressure protection device 11 is connected correctly. Secondly, continually provide argon gas to argon gas chamber 112 via argon gas inlets 114 located on the outer peripheral of low-back-pressure protection device 11. Turn on valve 9 and activate suction device 4, such that the gas piping between suction device 4 and bottom through hole 113 of low-back-pressure protection device 11 is vacuumed, until central vacuum chamber 111 of low-back-pressure protection device 11 is in a negative-pressure vacuum state relative to the ambient argon gas. A pressure reading of the gas piping can be monitored through pressure display device 7. Once the pressure reading of the gas piping reaches a predetermined value, activate welding power supply and control system 1, which in turn sets up keyhole plasma arc 14 on work pieces 3. Work piece 3 is configured to move about during the welding process, as long as plasma welding torch 2 and central vacuum chamber 111 of low-back-pressure protection device 11 are always maintained in positions opposing one another. Central vacuum chamber 111 of low-back-pressure protection device 11 provides the keyhole plasma arc and the keyhole molten pool with a negative-pressure vacuum with argon gas ambience. This generates a pressure gradient in the keyhole molten pool that points from a front side of the keyhole molten pool to a back side of the keyhole molten pool. The pressure gradient further enhances the stiffness of the front side of the keyhole molten pool as well as the stability of the penetrating arc, resulting in an enhancement in the piercing capability of the penetrating arc, without changing a force distribution and a temperature gradient of the keyhole molten pool.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A low-back-pressure penetrating arc welding apparatus for welding work pieces, comprising:
  a welding torch configured to generate a penetrating arc having a plume; and
  a low-back-pressure protection device comprising a central vacuum chamber and an argon gas chamber surrounding the central vacuum chamber,
  wherein:
    the welding torch and the low-back-pressure protection device are configured to be disposed on two opposing sides of the work pieces, and
    the penetrating arc penetrates the work pieces with the plume of the penetrating arc located in the central vacuum chamber,
    the low-back-pressure protection device is cylindrical,
    a central hollow of the low-back-pressure protection device comprises the central vacuum chamber,
    a peripheral trench of the low-back-pressure protection device comprises the argon gas chamber, the peripheral trench of the low-back-pressure protection device surrounding the central hollow of the low-back-pressure protection device, a bottom side of the low-back-pressure protection device is provided with a through hole connected with the central vacuum chamber, an outer wall of the low-back-pressure protection device is provided with one or more argon gas inlets connected with the argon gas chamber, the central vacuum chamber of the low-back-pressure protection device is configured to contact the work pieces, and the argon gas chamber of the low-back-pressure protection device is configured to be separated from the work pieces by a gap of 1-10 mm.

2. The low-back-pressure penetrating arc welding apparatus of claim 1, further comprising a piping system that comprises:

a suction device;
a pressure relief device;
a pressure display device;
a valve; and
a plurality of connecting pipes, wherein the suction device, the pressure relief device and the valve are connected successively by the plurality of connecting pipes to the through hole on the bottom side of the low-back-pressure protection device to form a piping from the suction device to the central vacuum chamber of the low-back-pressure protection device, and wherein the pressure display device is connected with the pressure relief device.

3. The low-back-pressure penetrating arc welding apparatus of claim 1, wherein the one or more argon gas inlets are uniformly provided on the outer wall of the low-back-pressure protection device.

4. A welding method using a low-back-pressure penetrating arc welding apparatus having a low-back-pressure protection device, comprising:

providing continually an argon gas to an argon gas chamber of the low-back-pressure protection device via one or more argon gas inlets on an outer wall of the low-back-pressure protection device;

setting a valve such that a piping from a suction device to a through hole on a bottom side of the low-back-pressure protection device is turned on;

activating the suction device such that a central vacuum chamber of the low-back-pressure protection device is maintained in a vacuum state; and activating a welding torch to generate a penetrating arc, the penetrating arc penetrating work pieces and forming a keyhole molten pool thereon, wherein a pressure gradient is generated in the keyhole molten pool, the pressure gradient pointing from a front side of the keyhole molten pool to a back side of the keyhole molten pool, and wherein the pressure gradient is configured to further enhance a stiffness of the front side of the keyhole molten pool, a stability of the penetrating arc and a piercing capability of the penetrating arc, without changing a force distribution and a temperature gradient of the keyhole molten pool.

5. The welding method of claim 4, wherein the welding torch and the low-back-pressure protection device are disposed on two opposing sides of the work pieces throughout an entire period of a welding process, and wherein a plume of the penetrating arc is located in the central vacuum chamber of the low-back-pressure protection device throughout the entire period of the welding process.

* * * * *